United States Patent [19]

Consoli et al.

[11] 4,144,386

[45] Mar. 13, 1979

[54] PROCESS FOR THE PRODUCTION OF FLEXIBLE POLYURETHANE FOAMS

[75] Inventors: Salvatore Consoli, Venezia-Mestre; Franco Galati, Melilli (Siracusa), both of Italy

[73] Assignee: Montedison S.p.A., Milan, Italy

[21] Appl. No.: 777,609

[22] Filed: Mar. 15, 1977

[30] Foreign Application Priority Data

Mar. 17, 1976 [IT] Italy .............................. 21288 A/76

[51] Int. Cl.² ...................... C08G 18/14; C08G 18/48; C08G 18/08
[52] U.S. Cl. ................................... 521/167; 521/128; 521/160; 521/174; 521/914
[58] Field of Search ................... 260/2.5 AP; 521/128, 521/167, 174, 914

[56] References Cited

U.S. PATENT DOCUMENTS

| | | | |
|---|---|---|---|
| 3,042,631 | 7/1962 | Strandskov | 260/77.5 SS |
| 3,461,086 | 8/1969 | Mogford et al. | 260/2.5 AP |
| 3,546,145 | 12/1970 | Granger et al. | 260/2.5 AP |
| 3,821,130 | 6/1974 | Barron et al. | 260/2.5 AP |
| 4,008,189 | 2/1977 | van Leuwen et al. | 260/2.5 AP |
| 4,026,829 | 5/1977 | Samura et al. | 260/2.5 AP |

FOREIGN PATENT DOCUMENTS 665758  6/1963  Canada ............................... 260/2.5 AP

*Primary Examiner*—H.S. Cockeram
*Attorney, Agent, or Firm*—Morgan, Finnegan, Pine, Foley & Lee

[57] ABSTRACT

There is provided a process for the preparation of flexible polyurethane foams having excellent softness, the process comprising reacting in the presence of a foaming agent, (A) a polyhydroxyl containing polyether including from 75 to 90% by weight of ethylene oxide, the polyether having a functionality equal to or greater than 2, an equivalent weight of between 700 and 2,200 for each hydroxyl group, from 2 to 35 percent of primary hydroxyl groups, based on the total number of hydroxyl groups present and a ratio of weight percent value of ethylene oxide to the percent value of primary hydroxyl groups based on the total number of hydroxyl groups present of between 2.1 and 42.5, and (B) a polyisocyanate which is the product of the partial polymerization of toluene diisocyanate and a polyhydroxyl containing polyether which includes propylene oxide, wherein (A) and (B) are present respectively in amounts such that the molar ratio of isocyanate groups to hydroxyl groups, NCO/OH, is equal to or greater than 1, preferably from 1:1 to 1.15:1.

18 Claims, No Drawings

PROCESS FOR THE PRODUCTION OF FLEXIBLE POLYURETHANE FOAMS

BACKGROUND OF THE INVENTION

The production of polyurethan foams, also commonly referred to as polyurethane foams, has been known for some time. In general, methods of production involve reacting a polyol, e.g., di- or polyfunctional hydroxy compound, such as polyhydroxyl containing polyethers, with di- or polyfunctional isocyanates in the presence of a foaming agent, optionally including other additives such as catalysts, cell-regulating surfactants, stabilizers, and the like. As is well known, foaming is usually accomplished by including water in the reaction system, the reaction between isocyanate and water providing carbon dioxide for foaming. Other foaming agents can be used, however, such as solid chemical or liquid "blowing agents".

The polyhydroxyl containing polyethers presently in common use in the production of flexible polyurethane foams are prepared by condensing one or more alkylene oxides on compounds having at least two active hydrogen atoms, such as, for instance, glycols, triols, tetrols, amine or mixtures thereof.

The alkylene oxides most commonly used are ethylene oxide and propylene oxide, either individually or in admixture with each other. Where mixtures of the two are employed, it is generally accepted that the ethylene oxide content should not exceed 45% by weight of the total mixture, otherwise the surface tension of the polyol as well as the resulting polymer will be much too high and will hinder the expansion or "growth" of the polyurethane in the presence of silicone surfactants. However, the use of polyethers having a high ethylene oxide content is necessary in the production of flexible polyurethan foams having low load-bearing capacities.

In order to overcome such drawbacks, it has been proposed in French Pat. No. 2,129,823, that the workability of a polyol having a high content of ethylene oxide, e.g., 58–77%, can be improved by mixing it with another polyol of very low ethylene oxide content, e.g., 4–15%. The resulting system exhibits a sufficiently low surface tension to be readily processable with commonly used silicone surfactants.

According to the aforementioned French patent, the amount of primary hydroxyl groups must be 35–44 percent hydroxyl groups present in the polyol of high ethylene oxide content and 35–60 percent primary hydroxyl groups present in the polyol of low ethylene oxide content. Moreover, the ratio of weight percent value of ethylene oxide to the percent value of primary hydroxyl groups based on the total number of hydroxyl groups present must be between 1.3 and 1.7.

A shortcoming in the process of the French patent is that two different free polyols are required in the reaction mixture and these are not compatible with each other. Another disadvantage is that as a result of using polyols having a relatively high proportion of primary hydroxyl groups, i.e. anywhere from 35 to 60 primary hydroxyls per 100 hydroxyl groups present only an amine-type catalyst can be employed in the system. This hinders the attainment of a proper balance between the polymerization reaction, i.e. the isocyanate-hydroxyl reaction, and the expansion or foaming reaction, i.e., the isocyanate-water reaction, which in continuous bulk polymerization methods is carried out with the use of a pair of catalyst: a metallic catalyst, e.g., stannous octoate, tin dibutyl dilaurate, and the like, in combination with an amine catalyst, e.g., tertiary amine.

A principal object of the present invention is to provide a method for producing polyurethane foams by the use of only a single free polyhydroxyl containing compound in the reaction mixture and a relatively low content of primary hydroxyl groups, thus avoiding the above-mentioned shortcomings connected with the process of the French patent.

This object and others which will be apparent from the following description, are accomplished by the present invention.

DESCRIPTION OF THE INVENTION

According to this invention, there is provided a process for the preparation of a flexible polyurethane foam which comprises reacting in the presence of a foaming agent, (A) a polyhydroxyl containing polyether which includes from 75 to 90% by weight of ethylene oxide, said polyether having (i) a functionality equal to or greater than 2, preferably between 3 and 4;

(ii) an equivalent weight of between 700 and 2,200 for each hydroxyl group;

(iii) from 2 to 35 percent of primary hydroxyl groups, based on the total number of hydroxyl groups present;

(iv) a ratio of weight percent value of ethylene oxide to the percent value of primary hydroxyl groups based on the total number of hydroxyl groups present of between 2.1 and 42.5;

and (B) a polyisocyanate which is the product of the partial polymerization of toluene diisocyanate and polyhydroxyl containing polyether, wherein components (A) and (B) are present in amounts such that the molar ratio of isocyanate groups to hydroxyl groups, NCO/OH, is equal to or greater than 1, preferably between 1:1 to 1.15:1.

The present invention also contemplates flexible polyurethan foams prepared by the above method, the foams also being characterized by having a very high degree of softness.

It is to be understood that various isomers of toluene diisocyanate can be used. For instance, these include compounds such as tolylene 2,4-diisocyanate and tolylene 2,6-diisocyanate alone or in admixture with each other, e.g., isomer mixtures of tolylene 2,4-diisocyanate and tolylene 2,6-diisocyanate in a ratio of 80:20 or 65:35, by weight, of the 2,4 isomer to the 2,6 isomer. Other mixtures of these two isomers, in different proportions, are also contemplated.

According to another important characteristic of this invention it is possible to use raw or undistilled toluene diisocyanate, that is, a toluene diisocyanate which is only partially purified, drawn from any section of a distillation column. Of course, it falls within the scope of this invention to use any isocyanate that differs from those specifically mentioned above which possess at least two isocyanate groups in the molecule.

The polyhydroxyl containing polyethers (A) of the process of this invention can be selected from a wide range of products prepared by the polycondensation of mixtures of propylene oxide and ethylene oxide, followed by the further condensation of propylene oxide alone, so that the final product will be a block copolymer having an ethylene oxide content of at least 75% by weight of the total. The condensation of the alkylene oxide or oxides is carried out with compounds having at least two active hydrogen atoms, such as glycols, triols, tetrols, and the like, amines, alkanolamines and polyamines, or mixtures of any of the foregoing.

The ethylene oxide and propylene oxide units can alternate in any manner along the polymer chain, provided however that the terminal portion of the polymerization reaction is carried out with propylene oxide only.

Representative examples of the polyhydroxyl containing polyether include polymers of propylene oxide and ethylene oxide containing from 75 to 90% by weight of ethylene oxide, terminated with propylene oxide units, and prepared by condensation with a hydrogen-active compound such as a glycol, e.g., dipropyleneglycol, and the like, a triol, e.g., glycerine, trimethylolpropane, and the like, a tetrol, e.g., pentaerythritol, and the like, a diamine, e.g., ethylenediamine, and the like, an alkanolamine, e.g., triethanolamine, and the like, or a mixture of any of the foregoing.

Similarly, component (B) is selected from a wide range of products, these being obtained from the partial polymerization of toluene diisocyanate with a polyhydroxyl containing polyether, the latter preferably having a functionality equal to or greater than 2, especially preferably between 3 and 4, and preferably having an equivalent weight of from 400 to 1,500, especially preferably from 1,000 to 1,500. The polyhydroxyl containing polyether of component (B) will contain propylene oxide and, if desired, a minor amount, e.g., up to 3% by weight of the total alkylene oxides, of ethylene oxide.

The polyhydroxyl containing polyether of component (B) can be prepared by procedures similar to those described above for the preparation of component (A).

Preferably, the partial polymerization product will contain from 15 to 40, especially preferably from 20 to 35% by weight of free isocyanate groups, -NCO. By way of illustration, component (B) can comprise partial polymerization products obtained by co-reacting toluene diisocyanate, either purified or raw or undistilled, including but not limited to 80:20 and 65:35 isomer mixtures of the ortho, para (2,4) and ortho, ortho (2,6) isomers, respectively, of toluene diisocyanate, with a polyhydroxyl containing polyether prepared from propylene oxide and a diol or triol.

Within the invention as broadly described above, conventional techniques of polyurethane foam preparation can otherwise be employed. Such techniques are described in detail, for instance, in "Polyurethanes, Chemistry and Technology", by Saunders and Frisch, Part II, Interscience Publishers, New York, 1964.

The process and articles of this invention are illustrated in the following examples. These are set forth for illustrative purposes only and are not to be construed as limiting the invention in any way. All parts are by weight, unless otherwise indicated.

DESCRIPTION OF THE SPECIFIC EMBODIMENTS

EXAMPLES 1-3

In a first procedure, a polyhydroxyl containing polyether is prepared by the random condensation on trimethylolpropane of a mixture of 80% by weight of ethylene oxide and 20% by weight of propylene oxide, in the presence of potassium hydroxyde, a polyadduction catalyst, followed by polypropylene oxide alone, to obtain a polyhydroxyl containing polyether containing 75% by weight of ethylene oxide units. The polymer is post-treated to remove the catalyst.

The resulting polymer is found to have an hydroxyl number of 42, an equivalent weight of 1336 and 12 primary hydroxyl groups, percent hydroxyl groups present.

In a second procedure, using a separate vessel, 117 parts by weight of an isomer mixture of toluene diisocyanate containing tolylene 2,4-diisocyanate and tolylene 2,6-diisocyanate, in a ratio of the 2,4 isomer to the 2,6 isomer, respectively, of 72.5/27.5, is reacted with 100 parts by weight of polyhydroxyl containing polyether prepared by polymerizing propylene oxide with glycerine and having an equivalent weight of 1533 and an hydroxyl number of 36.6.

The resulting polymeric isocyanate is found to contain 24% by weight of free isocyanate groups.

The polyhydroxyl containing polyether from the first procedure is admixed with the additives shown in Table 1, using a fast stirrer (3,000 rpm). After a homogeneous mixture is obtained, the polymeric isocyanate prepared by the second procedure is added in sufficient quantities to provide a ratio of isocyanate groups to hydroxyl groups in the total mixture as indicated in Table 1.

The mixture of polyether, polymeric isocyanate and additives is kept under stirring for several seconds and then poured into a die having the dimensions, 50 cm × 50 cm × 40 cm. Foam is allowed to form and the mixture is permitted to expand, and at the end of the expansion, the mixture is allowed to stand for 24 hours. After this period, the density and load-bearing capacity of the resulting polyurethane foam is evaluated. The results are summarized in Table 1.

TABLE 1.

| EXAMPLE | 1 | 2 | 3 |
|---|---|---|---|
| Ingredients | | | |
| Hydroxyl containing polyether | 100 | 100 | 100 |
| Water | 2.6 | 2.6 | 2.6 |
| Trichlorofluoromethane | — | 7 | 15 |
| Triethylenediamine | 0.13 | 0.12 | 0.15 |
| Stannous octoate | 0.20 | 0.25 | 0.30 |
| Silicone* | 1.0 | 1.2 | 1.4 |
| Polymeric isocyanate | (to provide NCO/OH ratio as shown) | | |
| Physical Properties | | | |
| NCO/OH ratio | 1.02 | 1.05 | 1.07 |
| Density of foam, g/l | 46 | 32 | 25 |
| Load-bearing capacity, kg/322 cm² (using a test piece having a thickness of 10 cm.)** | | | |
| 25% | 6.3 | 3.6 | 2.8 |
| 50% | 8.6 | 4.5 | 3.4 |
| 65% | 13.3 | 6.4 | 4.6 |

*Silicon F-260, Shin-Etsu Chemical Industries
**Determined according to ASTM D 1564-71E It is shown that the polyurethane foams according to this invention possess a very low load-bearing capacity, which is desired, both in the case of foamed products obtained with the use of water alone and without the use of a chemical blowing agent (Example 1), as well as in the case of foamed products of lower density, obtained with the use of a blowing agent, i.e., trichlorofluoromethane (Examples 2 and 3).

EXAMPLES 4-6

This example illustrates the use of different polyethers and polyisocyanates than are shown in Examples 1-3, but still in accordance with this invention. A sixcomponent Admiral 100-6WG type machine is used to carry out the polymerization.

In the presence of potassium hydroxide, a polyadduction catalyst, an hydroxyl containing polyether is prepared by the random condensation on glycerine of a mixture of 77% by weight of ethylene oxide and 23% by weight of ethylene oxide, followed by propylene oxide alone. The resulting polyhydroxyl containing polyether has an ethylene oxide content of 76% by weight. The polymer is post-treated to remove the polyadduction catalyst.

The resulting polyether is found to have an hydroxyl number of 46, an equivalent weight of 1,220 and 20 primary hydroxyl groups, percent hydroxyl groups present.

In a separate vessel, a polymeric isocyanate is obtained by reacting 146 parts by weight of a toluene diisocyanate isomer mixture containing tolylene 2,4-diisocyanate and tolylene 2,6-diisocyanate in a ratio of the 2,4 isomer to the 2,6 isomer, respectively, of 80:20, with 100 parts by weight of a polyhydroxyl containing polyether prepared by the polycondensation of trimethyl propane with propylene oxide and having an equivalent weight of 1,000 and an hydroxyl number of 56.

The resulting polymeric isocyanate contains 27% by weight of free isocyanate groups.

Using the procedure described in Examples 1–3, the polyether, the polymeric isocyanate and the additives shown in Table 2 are mixed and allowed to foam to completion. After left standing for 24 hours, the polyurethane foam is evaluated for physical properties. The results are reported in Table 2.

TABLE 2.

| EXAMPLE | 4 | 5 | 6 |
|---|---|---|---|
| Ingredients | | | |
| Hydroxyl containing polyether | 100 | 100 | 100 |
| Water | 4 | 4 | 4 |
| Trichlorofluoromethane | — | 8 | 16 |
| Triethylenediamine | 0.08 | 0.08 | 0.12 |
| Dimethylethanolamine | — | 0.10 | — |
| Stannous octoate | 0.22 | 0.24 | 0.25 |
| Silicone* | 1.3 | 1.4 | 1.5 |
| Polymeric isocyanate | (to provide NCO/OH ratio as shown) | | |
| Properties | | | |
| NCO/OH ratio | 1.03 | 1.04 | 1.06 |
| Density of foam, g/l | 31 | 24 | 20 |
| Load-bearing capacity, kg/cm$^2$ (using a test piece having a thickness of 10 cm)** | | | |
| 25% | 5.4 | 3.2 | 2.5 |
| 50% | 7.5 | 5.4 | 4.4 |
| 65% | 10.7 | 8.4 | 6.4 |

*as in Examples 1–3
**as in Examples 1–3

It is shown that polyurethane foams having very low load-bearing capacities are consistently obtained.

Obviously, other modifications and variations of the present invention are possible in the light of the above teachings. It is, therefore, to be understood that changes may be made in the particular embodiments of the processes and foamed articles described above which are within the full intended scope of the invention as defined in the appended claims.

We claim:

1. A process for the preparation of a flexible polyurethane foam, the process comprising reacting in the presence of a foaming agent (A) a polyhydroxyl containing polyether which includes from 75 to 90% by weight of ethylene oxide, said polyether being terminated with propylene oxide only and having been prepared by the polycondensation of a mixture of propylene oxide and ethylene oxide with a compound having at least two active hydrogen atoms said polyether having
   (i) a functionality equal to or greater than 2;
   (ii) an equivalent weight of between 700 and 2,200 for each hydroxyl group;
   (iii) from 2 to 35 percent of primary hydroxyl groups, based on the total number of hydroxyl groups present, and
   (iv) a ratio of weight percent value of ethylene oxide to the percent value of primary hydroxyl groups based on the total number of hydroxyl groups present of between 2.1 and 42.5; and
   (B) a polyisocyanate which is the product of the partial polymerization of toluene diisocyanate and a polyhydroxyl containing polyether which contains propylene oxide, wherein components (A) and (B) are present in amounts such that the molar ratio of isocyanate groups to hydroxyl groups is equal to or greater than 1.

2. The process according to claim 1 wherein said compound having at least two active hydrogen atoms is selected from among glycols, triols, tetrols, alkanolamines, polyamines, or mixtures of any of the foregoing.

3. The process according to claim 2 wherein the glycol is dipropylene glycol, the triol is glycerine or trimethylolpropane, the tetrol is pentaerythritol, the polyamine is ethylenediamine and the alkanolamine is triethanolamine.

4. The process according to claim 1 wherein said polyhydroxyl containing polyether (A) has a functionality of between 3 and 4.

5. The process according to claim 1 wherein said polyhydroxyl containing polyether (A) and said polyisocyanate (B) are present in amounts such that the molar ratio of isocyanate groups to hydroxyl groups is between 1:1 and 1.15:1.

6. The process according to claim 1 wherein the polyhydroxyl containing polyether of component (B) has a functionality equal to or greater than 2.

7. The process according to claim 6 wherein the polyhydroxyl containing polyether of component (B) has a functionality of between 3 and 4.

8. The process according to claim 1 wherein the polyhydroxyl containing polyether of component (B) has an equivalent weight of between 400 and 1,500.

9. The process according to claim 8 wherein the polyhydroxyl containing polyether of component (B) has an equivalent weight of between 1,000 and 1,500.

10. The process according to claim 1 wherein said polyisocyanate (B) contains from 15 to 40% by weight of free isocyanate groups.

11. The process according to claim 10 wherein said polyisocyanate (B) contains from 20 to 35% by weight of free isocyanate groups.

12. The process according to claim 1 wherein the polyhydroxyl containing polyether of component (B) also includes up to 3% by weight of ethylene oxide.

13. The process according to claim 1 wherein the foaming agent is water.

14. The process according to claim 1 wherein the foaming agent is trichlorofluoromethane.

15. The process according to claim 1 which is carried out in the presence of a catalyst.

16. The process according to claim 15 wherein said catalyst comprises a metal catalyst in combination with an amine catalyst.

17. The process according to claim 1 which includes a minor amount of silicone.

18. A flexible polyurethane foam prepared by the method of claim 1.

* * * * *